US008892463B2

(12) United States Patent
Mullin et al.

(10) Patent No.: US 8,892,463 B2
(45) Date of Patent: Nov. 18, 2014

(54) KIOSK FOR RENTING SECURABLE DEVICES CONFIGURED TO OPERATE AS A POINT-OF-SALE

(71) Applicant: Best Lockers, LLC, Orlando, FL (US)

(72) Inventors: James Mullin, Livermore, CA (US); John Zaniker, Severna Park, MD (US); James Conrad, San Lorenzo, CA (US); Daryle Bobb, Rockville, MD (US)

(73) Assignee: Best Lockers, LLC, Orlando, FL (US)

( * ) Notice: Subject to any disclaimer, the term of this patent is extended or adjusted under 35 U.S.C. 154(b) by 0 days.

(21) Appl. No.: 13/841,567

(22) Filed: Mar. 15, 2013

(65) Prior Publication Data

US 2013/0254048 A1    Sep. 26, 2013

Related U.S. Application Data

(63) Continuation of application No. 12/269,704, filed on Nov. 12, 2008, now Pat. No. 8,410,901.

(60) Provisional application No. 60/987,257, filed on Nov. 12, 2007.

(51) Int. Cl.
*G07F 17/12* (2006.01)
*G06Q 20/20* (2012.01)
*G07C 9/00* (2006.01)
*G06Q 30/06* (2012.01)

(52) U.S. Cl.
CPC .......... *G06Q 20/206* (2013.01); *G07C 9/00142* (2013.01); *G07C 9/00912* (2013.01); *G06Q 30/0645* (2013.01)
USPC .......................................................... 705/18

(58) Field of Classification Search
CPC .. G06Q 30/0645; G07F 17/12; G07F 17/0014
See application file for complete search history.

(56) References Cited

U.S. PATENT DOCUMENTS

| | | |
|---|---|---|
| 4,698,630 A | 10/1987 | Ellsberg |
| 5,169,222 A | 12/1992 | Bollore et al. |
| 5,231,272 A | 7/1993 | Mardon |
| 5,345,379 A | 9/1994 | Brous et al. |
| 5,894,277 A | 4/1999 | Keskin et al. |
| 5,946,660 A | 8/1999 | McCarty et al. |
| 6,185,773 B1 | 2/2001 | Goedde |
| 6,655,180 B2 | 12/2003 | Gokcebay et al. |
| 6,694,217 B2 | 2/2004 | Bloom |
| 6,791,450 B2 | 9/2004 | Gokcebay et al. |
| 6,806,807 B2 | 10/2004 | Cayne et al. |

(Continued)

FOREIGN PATENT DOCUMENTS

| | | |
|---|---|---|
| WO | WO 2005/076233 A1 | 8/2005 |
| WO | WO 2010/067006 A2 | 6/2010 |
| WO | WO 2012/050891 A1 | 4/2012 |

*Primary Examiner* — Shay S Glass
(74) *Attorney, Agent, or Firm* — Dentons US LLP

(57) ABSTRACT

A system and method for assigning controlled access to a securable device may include (i) a kiosk configured to enable a user to rent a securable device from among multiple securable devices and (ii) a lock unit associated with the securable device and being in communication with the kiosk. The lock unit may further be configured to enable the user to access the securable device after being rented by the user via said kiosk. The kiosk may further be configured to enable the user to purchase goods or services in addition to rental of the securable device.

20 Claims, 8 Drawing Sheets

(56) References Cited

U.S. PATENT DOCUMENTS

| | | |
|---|---|---|
| 6,879,243 B1 | 4/2005 | Booth et al. |
| 6,999,825 B2 | 2/2006 | Inomata |
| 7,176,782 B2 | 2/2007 | Shitan |
| 7,445,300 B2 | 11/2008 | Collins et al. |
| 7,477,132 B2 | 1/2009 | Mayer et al. |
| 2002/0035515 A1* | 3/2002 | Moreno .......................... 705/26 |
| 2002/0180582 A1 | 12/2002 | Nielsen |
| 2003/0141840 A1 | 7/2003 | Sanders |
| 2005/0040931 A1 | 2/2005 | Shitan |
| 2005/0068178 A1 | 3/2005 | Lee et al. |
| 2005/0179349 A1 | 8/2005 | Booth et al. |
| 2005/0190037 A1 | 9/2005 | Shitan et al. |
| 2008/0170355 A1 | 7/2008 | Kyriakides et al. |
| 2009/0033456 A1 | 2/2009 | Castillo et al. |
| 2009/0267564 A1 | 10/2009 | Gerber |
| 2010/0102780 A1 | 4/2010 | Koh |
| 2011/0301748 A1 | 12/2011 | Lecarpentier |
| 2012/0078413 A1 | 3/2012 | Baker, Jr. |
| 2012/0098493 A1 | 4/2012 | Budike |

* cited by examiner

Rent a Locker
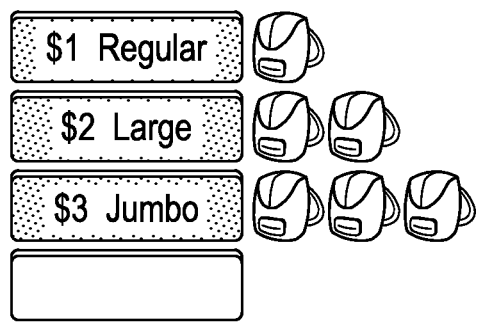
Cancel
FIG. 5

Your Rentals
| Item | Price |
|---|---|
| Large Locker | $2.00 |
| Total | $2.00 |
| Amount paid | $0.00 |
| Balance | $2.00 |
Swipe your credit card
OR
Insert cash (no change is given)
OR
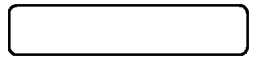
Cancel
Waiting for payment
FIG. 6

Key in a password for locker 1015 and press ENTER

KIOSK FOR RENTING SECURABLE DEVICES CONFIGURED TO OPERATE AS A POINT-OF-SALE

CROSS-REFERENCES TO RELATED APPLICATIONS

This application for patent is a Continuation of co-pending U.S. patent application Ser. No. 12/269,704 filed Nov. 12, 2008, which claims the benefit of U.S. Provisional Application No. 60/987,257, filed on Nov. 12, 2007, the disclosure of which is hereby incorporated by reference into the present patent application in its entirety.

BACKGROUND OF THE INVENTION

1. Technical Field of the Invention

The invention relates to assigning controlled access to securable devices such as lockers and other temporary storage enclosures, vehicles, vending machines, luggage carts and rental appliances.

2. Description of Related Art

Assigning controlled access to a securable device (for example a storage locker or other rental device) in a cost effective, secure and customer-convenient manner is a continuing challenge in many business contexts.

For example, entertainment venues such as ski areas, amusement parks and water parks often provide storage lockers and other equipment that a guest can rent for a period of time to store personal belongings or to enhance enjoyment of the venue. For example, storage lockers may be used when a guest is taking a ride on a water slide, when it gets too warm to ski with excessive clothing, when the personal articles (e.g. cameras) one is carrying are not suitable for a "thrill ride" such as a roller-coaster, and in other similar types of situations. Some users will use the locker only to store a wallet while others will use the lockers to store multiple purses, backpacks, etc.

Normally there is a charge for using a locker. Historically, small lockers that could be rented for a quarter were the norm. Recently, as the cost of doing business in these venues has increased, it has become unviable to only charge a few coins for the rental and the operators of such rental facilities (whether an owner of a venue or a concessionaire) have been charging more. In some venues there is an attendant that collects money from the guest and then hands them a mechanical key. The guest can then use the locker they are assigned for the time period they have paid for. This system has disadvantages: first, attendant salaries can be a major expense; second, there are accountability issues because it is difficult to audit the true rental income; and third; it is difficult to maintain security with mechanical keys. The keys may be passed around and not turned in. The operator must then obtain new keys and/or change the locks.

The limitations and disadvantages presented by coins and mechanical keys have motivated the development of locker systems based on electronic hardware and software. Such electronic systems may be designed to accept cash (banknotes) or credit cards and can provide financial reports based on system utilization. These systems conventionally employ a self-service pay station (or "kiosk"), and a server that in turn controls a number of lockers. In such conventional electronic systems, a user may be requested to follow directions for renting a storage locker (or other rental unit or securable device) by way of instructions presented on an electronic display or touch screen monitor. At the kiosk, the user may select a locker or other securable device, make a payment for a rental period, and either obtain or enter a personal identification number ("PIN") for the assigned locker. Alternately, some known systems have employed biometrics and electronic RFID-based tokens in place of user codes. Once the user has completed a rental transaction, the user may be directed to proceed to the assigned locker which the system has enabled for use. Enabling for use, conventionally, means remotely unlocking the storage locker. The user can then access the locker and store articles therein by opening its unlocked door, storing the articles, and shutting and locking the door.

Thereafter, each time the user wants to access the locker, the user must first proceed to the kiosk, enter the PIN or scan the personal RFID tag and only then proceed to his or her locker. The user is normally allowed to access the locker frequently during their rental period. This means that the kiosk serves as both the rental station and the individual point-of-access for all the lockers coupled to the kiosk.

The above described architecture gives rise to several problems. For example, when the lockers are located at an entertainment venue, guests usually arrive and leave such a venue at similar times based on the time the area opens and closes and what special events may be scheduled. Consequently, a significant queue of guests will be assembled at the kiosk during these peak usage periods. This is inconvenient for the user and decreases revenue because new renters cannot get to the kiosk when it is being used by current renters trying to rent new lockers or gain access the locker they have already rented. This problem is amplified by the fact that users are normally in groups of family and friends, each wanting to use their rented locker multiple times during the rental period. Other guests become frustrated when this happens. Furthermore, security risks arise because of the heightened chance that a guest will see the personal code of another guest at the pay station, or that a locker unlocked remotely by the kiosk upon entry of an authorized user's PIN will be accessed by an unauthorized person before the authorized user arrives at the locker after leaving the kiosk.

The existing architectures also pose reliability and customer satisfaction issues because when either the kiosk or the electronic communication network connecting the kiosk to the rental units fails, users are not able to access their rental unit.

Accordingly, a need exists for a locker system that will eliminate the preceding shortcomings.

SUMMARY OF THE INVENTION

Controlled access to a securable device is assigned whereby a kiosk is operable to assign an authorized user an ability to access a securable device selected from among a plurality of securable devices located remotely from the kiosk. The kiosk associates a unique personal identification number (PIN) with the authorized user and with the selected securable device, and is operable to transmit the unique PIN to the selected securable device, inform the user of the unique PIN; provide the user with location information of the selected securable device. The selected securable device is adapted to accept entry, at the securable device, of a PIN, and permits access upon entry of the unique PIN.

One embodiment of a system for assigning controlled access to a securable device may include (i) a kiosk configured to enable a user to rent a securable device from among multiple securable devices and (ii) a lock unit associated with the securable device and being in communication with the kiosk. The lock unit may further be configured to enable the user to access the securable device after being rented by the user via said kiosk. The kiosk may further be configured to enable the user to purchase goods or services in addition to rental of the securable device.

One embodiment of a method for assigning controlled access to a securable device may include enabling, via a kiosk, a user to rent a securable device from among multiple securable devices. A lock unit associated with the securable device may enable the user to access the securable device after being rented by the user via the kiosk. The user may be enabled by the kiosk to purchase goods or services in addition to rental of the securable device.

BRIEF DESCRIPTION OF THE DRAWINGS

FIGS. 5-8 illustrate examples of a user interface suitable for an embodiment of the invention.

DETAILED DESCRIPTION OF THE DRAWINGS

The present inventors have recognized that problems and deficiencies inherent in the prior art described above may be mitigated by a securable device such as, for example, a storage locker, adapted to accept entry of a PIN such that the securable device permits access only upon entry of a unique PIN communicated to an authorized user and to the securable device by a remotely located kiosk, where the kiosk is operable to transmit the unique PIN to the selected securable device, inform the user of the unique PIN, and provide the user with location information of the selected securable device.

Figure 2:
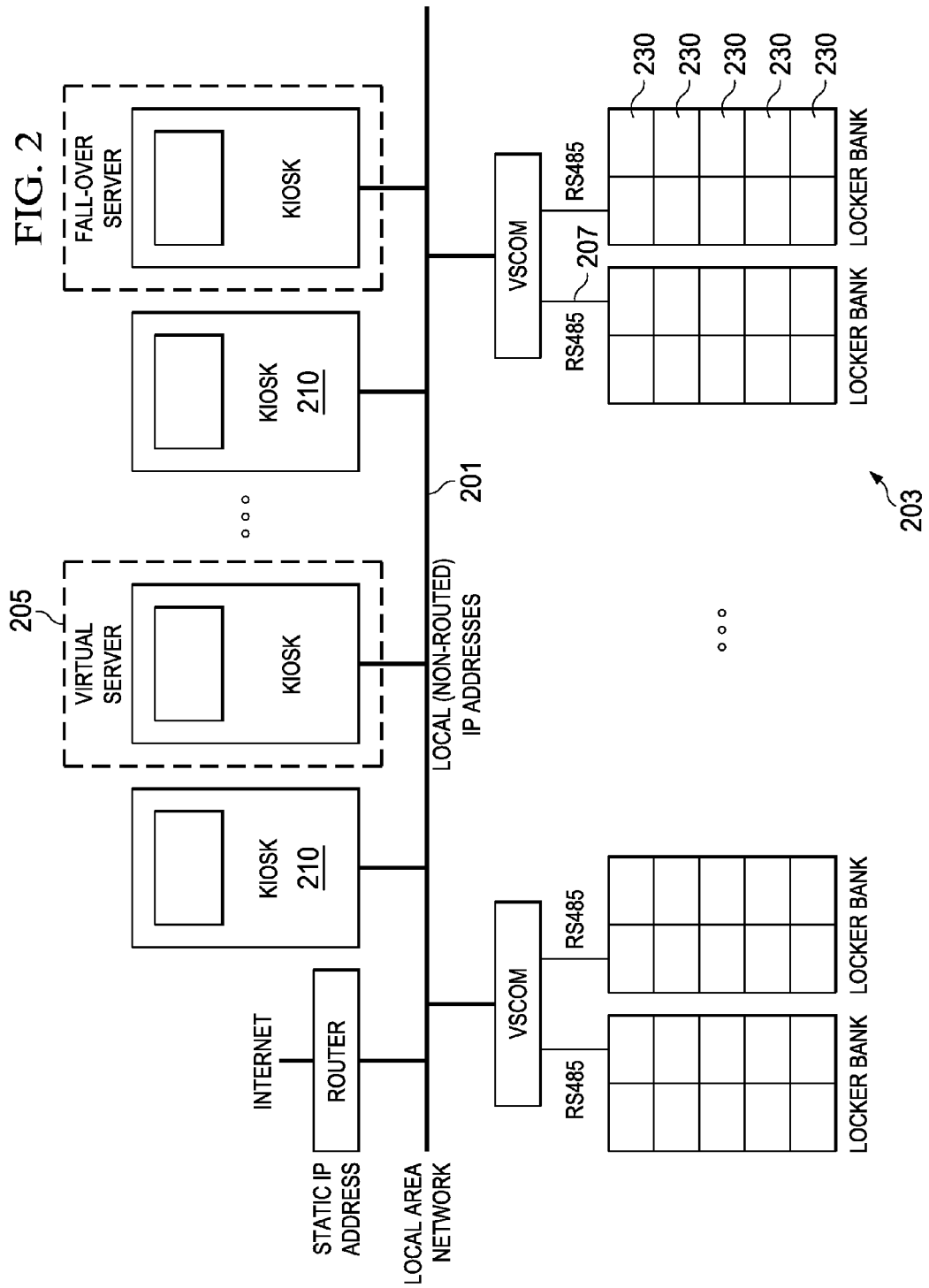
FIG. 2 illustrates an example of a high level component architecture usable in an embodiment of the invention.

Referring now to FIG. 2, in an embodiment, one or more such kiosks 210 may be networked together with any number of securable devices, such as lockers 230. Although in FIG. 2 and elsewhere in the specification and drawings, reference is made to "Lockers" it will be understood by one skilled in art that a securable device, as contemplated by the inventors, includes many types of devices or equipment amenable to having controlled access assigned to an authorized user. For example a securable device may include a rental appliance (such as, for example, a clothes washer or dryer), a vending machine, a rental vehicle, or a recreation or entertainment device.

As illustrated in FIG. 2, any locker 230 within a facility may be rented from any other kiosk 210 connected to a facility local area network 201. Furthermore, the facility local area network 201 may be communicatively coupled to the Internet, enabling a user to go on-line to rent a locker 230 in advance. Being on-line also enables an operator of the system to view current rental status in-real-time and to manage functional attributes on-line. These attributes could include pricing, messaging on the touch screen, report generation, and any other attributes designated by the operator.

Further, kiosk 210 may be operable as a point of sale device. In an embodiment, kiosk 210 may accept payment in the form of cash, a credit card, a debit card and/or an RFID device. In a further embodiment, kiosk 210 may be adapted to provide a user with an opportunity to procure, for example, by rental or purchase, related goods and services. For example, in a water park setting, equipment (such as tubes and other devices that are used in water rides) could be rented by the guest. At a ski resort, lift tickets, ski lessons and/or ski equipment may be offered. Kiosk 210 may include a printer capable of printing a proof of purchase receipt that includes information on the goods and services purchased. In an embodiment, a bar code may be printed on the receipt that may then be electronically scanned when the receipt is redeemed for the goods and services purchased. Electronically scanning the receipt at redemption provides further opportunity for the system to automate and track utilization.

A securable device, such as a locker 230 may be secured by way of an individual electronic lock unit and be communicatively coupled to kiosk 210. The securable device may function in a networked mode, under common control of, for example kiosk 210, or in a stand-alone mode that may advantageously be adapted in the event of a power or network failure. Each securable device (and/or its individual lock unit) may have the capability, after receiving an authorized user's unique PIN from kiosk 210, to accept entry of a PIN, and permit access only upon entry of the unique PIN. Advantageously, this capability may be operable irrespective of whether the securable device remains communicatively coupled to kiosk 210. For example, the securable device is advantageously adapted to store one or more current user PIN's in such a manner that a network or power failure will not interfere with the user's ability to access the securable device.

Figure 1:
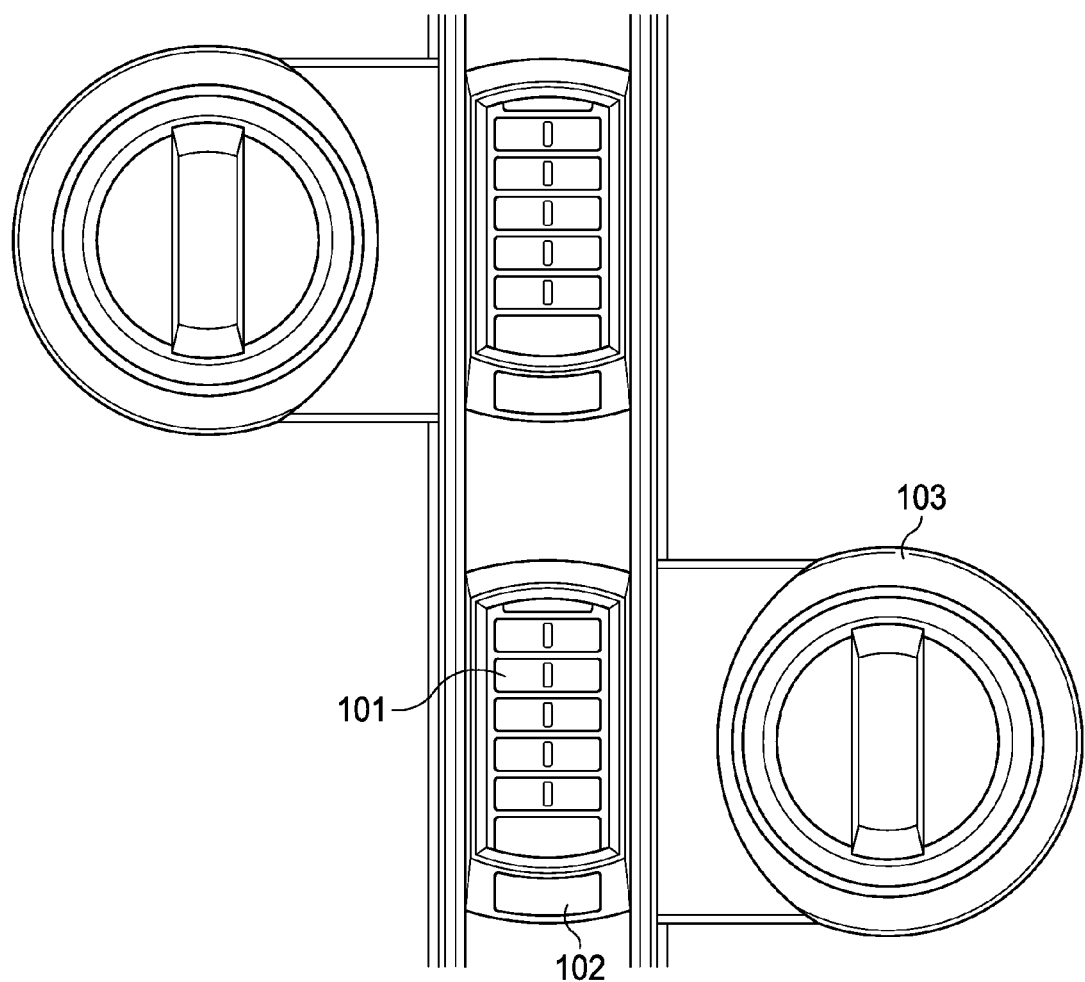
FIG. 1 illustrates an apparatus embodiment of the invention.

Referring now to FIG. 1, the securable device may provide a user interface such as a touch pad 101 or the like to input a PIN and an "end rental" button 102 that enables the user to end the rental as part of the process of using the individual locker 230. When used, this feature may clear the individual locker 230 for re-rental to a new user. In an embodiment, the user interface may provide means to output information or messages to the user by way, for example, of one or more indicator lights, a message screen or an audio message indicator.

Access to securable devices by the system operator may be provided, for example by way of a "master code". Such a master code may enable system operator employees such as on-site attendants to access individual lockers in the event the guest has forgotten his user code. Advantageously, for security reasons, a fresh master code may be regenerated on a daily basis. Similarly, "maintenance codes" that may be used by on-site attendants for opening a group or all lockers simultaneously for cleaning at the end of the day may be generated daily or on any other periodic basis.

In an embodiment, each individual securable device may have the ability to retain, after receiving a currently active unique PIN code from kiosk 210, an audit trail of use for that individual locker and the ability to identify which type of code that was used to access a particular locker.

In an embodiment, each touchpad 101 may comprise an intelligent electronic keypad and electronic interconnect capable of being plugged into a local area network. Electrical and mechanical interfaces to any number of securable devices may be provided by a common frame or "rack" assembly. This assembly may interface with and provide power to both the electronic key pad and the lock mechanism, enabling a locker unit to be opened once a correct PIN code has been entered. In an embodiment, upon entry of the correct PIN, at the individual locker unit, the electronic keypad assembly provides power to the lock mechanism, enabling the securable device to be accessed by the user or attendant.

In an embodiment, entry of the correct PIN enables operation of a mechanical actuator 103 (including, for example, a lever, knob, or push button) to disengage the lock mechanism and to open the locker door. Mechanical actuator 103 may, for example, be located on a stationary locker frame or mounted on a locker door. Advantageously, a user's manual operation of mechanical actuator 103 may provide a portion or all of the force and power needed to disengage or engage a lock mechanism (such as a bolt, for example) thereby minimizing the need to utilize solenoids and motors to move the lock mechanism. The inventors have found that these conventional electrical devices have poor reliability, particularly when deployed in a locker environment associated with, for example, a ski area or theme park where there are extreme temperatures, water contamination and other challenging conditions including frequent and aggressive use.

Referring now to FIG. 2, it is illustrated how kiosk 210 may be communicatively coupled by local area network (LAN) 201 to a number of lockers 230 and to at least one virtual server 205. Advantageously, server 205 may be virtual server operating on existing processing means within kiosk 210. In an embodiment, LAN 201 may be a wireless LAN. Advantageously, a group of lockers 230 (a "locker bank" 203) may be connected to LAN 201 by way of a serial data bus 207.

Figure 3:
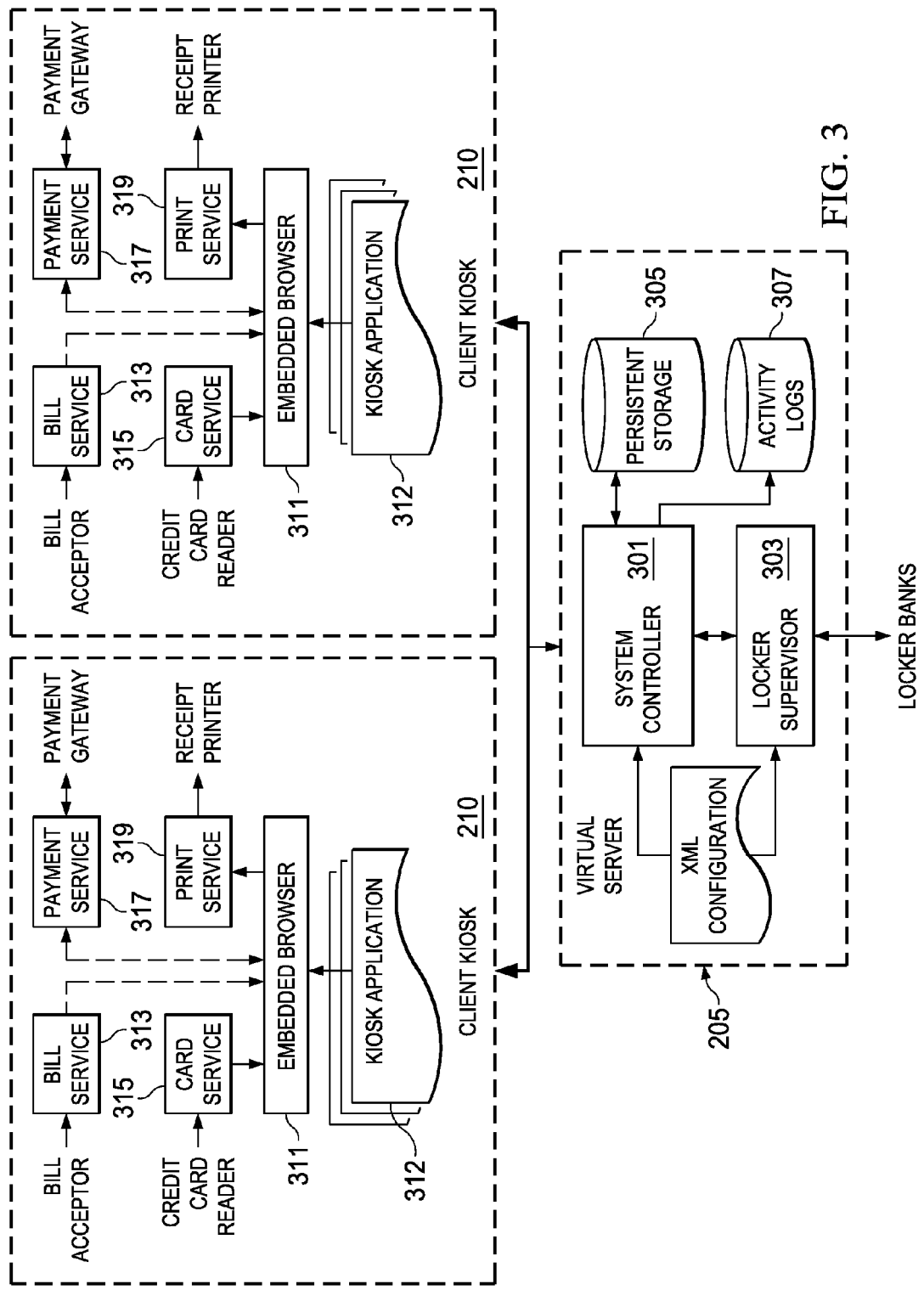
FIG. 3 illustrates an example of a high level software architecture usable in an embodiment of the invention.

Referring to FIG. 3, a software architecture adapted for use with a system embodiment may include several kiosks 210. Virtual server 205 (which, in an embodiment, may be a kiosk 210 assigned certain additional tasks and having certain capabilities not ordinarily required by every kiosk 210) may include system controller 301, and locker supervisor 303. Virtual server 205 may be communicatively coupled to any number of client kiosks 210, which may be under the supervision of system controller 301. Advantageously, persistent storage 305 provides a central location to collect and store, for example, transaction data generated by the various client kiosks 210.

Each kiosk 210 may be provided with an embedded browser 311 that may provide a user interface and is adapted to execute one or more kiosk applications 312. Kiosk applications 312 may include, for example, an application to conduct a locker rental transaction, to rent or sell related items, and to provide administration functions such as reports of transactions, locker usage statistics and the like. Embedded browser 311 may be adapted to conduct a rental or other transaction whereby the user remits payment by way of a bank (debit or credit) card processed by card service module 315, or by a cash payment processed by bill service module 313. Transactions paid by bank card may be verified and settled by way of payment service module 317 which may be communicatively coupled via a payment gateway to a third party transaction settlement service as is known in the art. Print service module 319 may interface with embedded browser 311 and a receipt printer to provide printed proof of sale receipts. Thus, the kiosk 210 may be operable as a free standing electronic funds transfer point of sale (EFT POS) device.

Figure 7:
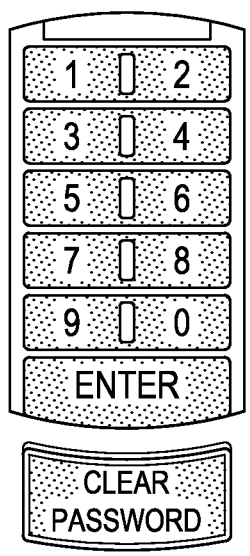

Advantageously, kiosk 210 may have a display screen providing a graphical, touch screen user interface using methods known in the art. For example, kiosk 210 may provide a screen display such as that illustrated in FIG. 5, providing a user with options for various size lockers. Once a transaction is selected by the user, the user may be presented with a screen display such as that illustrated in FIG. 6, providing the user with an itemized list of costs, a total cost, and payment options. In an embodiment, the user is permitted to select his or her own PIN for use in connection with a rental. This PIN is then associated with a selected locker by kiosk 210. Where the PIN is selected by the user, the user may advantageously be presented with a screen display such as that illustrated in FIG. 7, by which the user may be enabled to enter the desired PIN on display of a key pad similar to the physical keypad located at each locker or other securable device.

Figure 8:
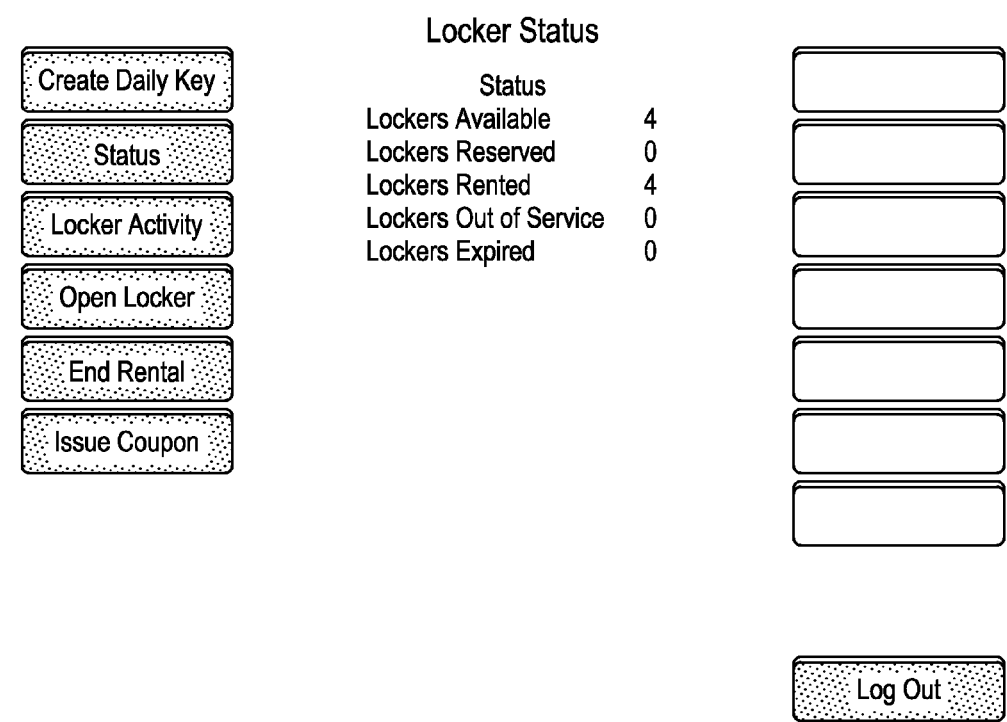

In an embodiment, kiosk 210 may be operable to interface with a system operator or administrator. Accordingly kiosk 210, in response, for example, to entry of an appropriate management code or key, may be adapted to provide a screen display such as that illustrated in FIG. 8, whereby an administrator or other authorized agent of the system operator may obtain access to one or to a block of lockers and/or may produce certain administrative reports such as sales records, usage rates, trouble reports, and the like.

Figure 4:
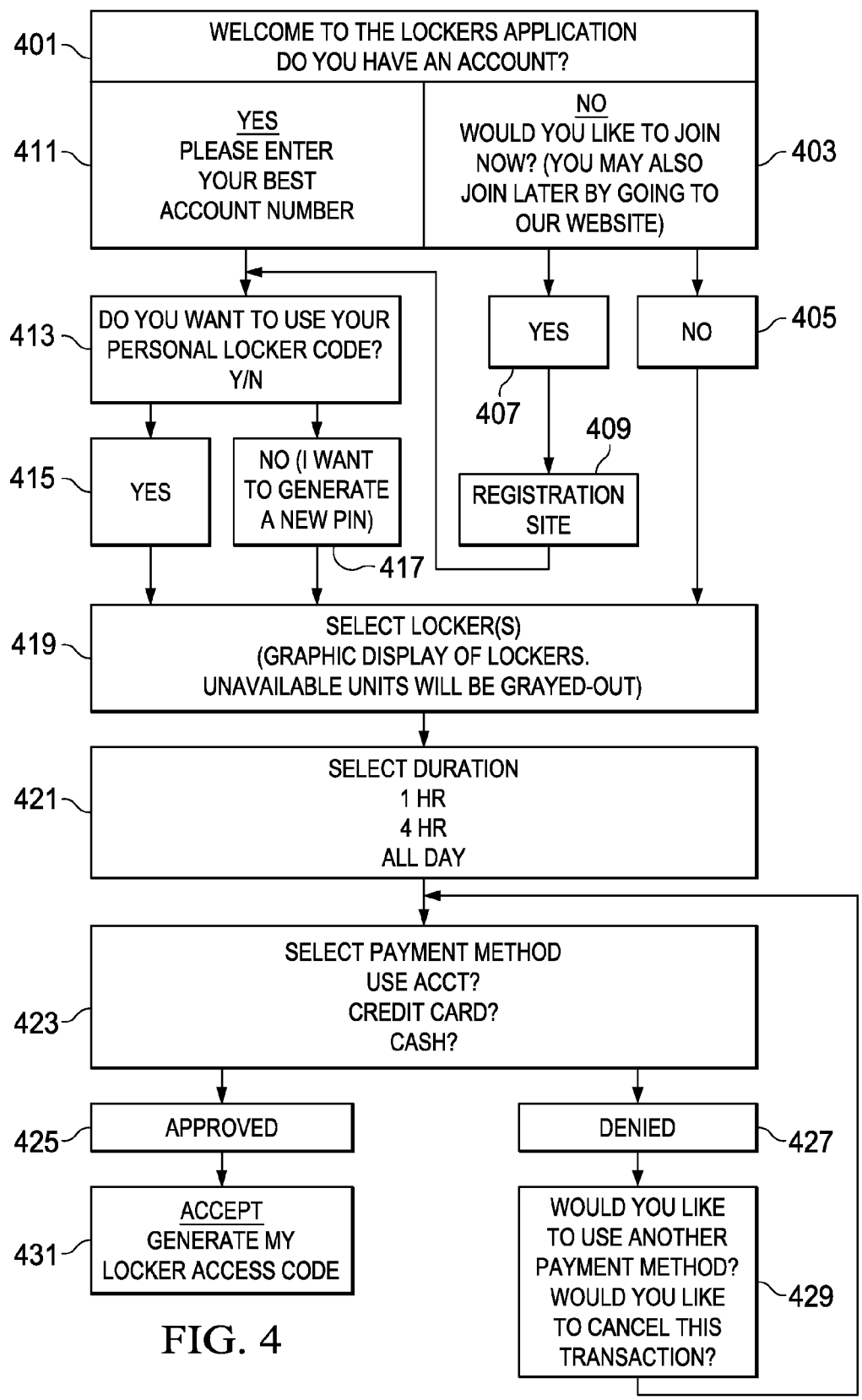
FIG. 4 is a flow chart illustrating steps performed in connection with an embodiment of the invention.

Referring now to FIG. 4, a series of potential interactions between a user and the kiosk are illustrated. At step 401, for example, the kiosk may present the user with a "welcome screen" or the like, and provide a user having an existing account to so indicate. If the user does not have an account, the kiosk may, at step 403, provide an opportunity for the user to open an account. If the user declines, step 405, the user will next be presented with an opportunity to select or be assigned a locker, as discussed further below. If the user accepts the opportunity, step 407, to open an account, the kiosk may present the user, step 407, with a registration site at which the user may enter personal and financial information, for example. When the user has an existing account and enters a personal code, step 411, or successfully registers, step 409, the user may be presented with the decision, step 413 whether to use that personal code as a PIN, step 415, for subsequent locker access, or to request, step 417, a new PIN.

Locker selection may occur as illustrated in step 419. In an embodiment, a user is given an opportunity to select a specific locker by, for example, location. In another embodiment, the user is permitted to specify, for example, the locker size and/or other general parameters regarding the locker (e.g., its general location within a venue) but the specific locker number assignment is made by the system. Advantageously, locker assignments may be selected by the system and the selection determined, for example, based on actual assignment of other securable devices, projected assignment of other securable devices, and/or reserved assignment of other securable devices. Thereby, for example, overcrowding caused by a number of users simultaneously accessing adjacent lockers may be minimized.

Next, the user may be provided the opportunity to select, step 421, a duration for the rental, after which the user may be provided, step 423, with one or more payment options. Because the kiosk may operate as an EFT POS, electronic payment means may be subject to a conventional approval process, step 425. In the event of a disapproved electronic transaction, step 427, the user may be given the opportunity to provide an alternate payment means, or to cancel the transaction, step 429. Upon acceptance of payment, a locker access code (unique PIN) will be generated, step 431. In an embodiment, the unique PIN is specified by the user. Alternately, the unique PIN may be randomly generated at the kiosk. In either case, the unique PIN is transmitted to the selected locker, and the user is informed of the unique PIN.

In an embodiment, at least some receipts may be imprinted with a bar code or the like and serve as coupons for merchandise or services to be fulfilled at another location. For example, the kiosk may be operable to accept payment for rental of recreation equipment appropriate to the venue. In such case the user, having paid for the rental, may be provided by the kiosk with a bar coded receipt which may be presented for fulfillment, for example, at an appropriate, separate location (where the equipment is normally stored and vended, for example).

Various specifications could apply to a locker system as described above. These specifications could include information about the functional characteristics of the system; the physical characteristics of the system; the power requirements of the system; the cabling necessary to interconnect all aspects of the lockers, kiosks, and controllers (along with any other components); and the software contained within the system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various logical blocks and algorithm steps described herein may be implemented as hardware, software, or combinations of both. Whether such functionality is implemented as hardware or software depends upon the particular application and design constraints imposed on the overall system. The described functionality may be implemented in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

Methods described in connection with the embodiments disclosed herein may be embodied directly in hardware, in a software module executed by a processor, or in a combination of the two. A software module could reside in any form of storage medium known in the art, including, without limitation, RAM, ROM, or flash memory, a CD-ROM, a removable disk, or otherwise. In the alternative, the storage medium may be integral to the processor. The processor and the storage medium may reside in an ASIC. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for assigning controlled access to a securable device, said system comprising:
    a kiosk configured (i) to enable a user to rent a securable device from among a plurality of securable devices, (ii) to rent the securable device in response to the user performing a financial transaction via the kiosk, and (iii) to associate a unique personal identification number (PIN) with the user and the securable device; and
    a lock unit associated with the securable device and being in communication with said kiosk, said lock unit further being configured to enable the user to access the securable device after being rented by the user via said kiosk and in response to receiving the PIN submitted by the user, said kiosk further being configured to enable the user to purchase goods or services in addition to rental of the securable device.

2. The system according to claim 1, wherein said kiosk, in enabling the user to rent the securable device and purchase goods and services, is configured as an Electronic Funds Transfer Point of Sale (EFT POS).

3. The system according to claim 1, wherein said kiosk includes a printer to print a receipt of a purchase of the goods or services.

4. The system according to claim 1, further comprising a second kiosk configured to enable a user (i) to rent the securable device from among the plurality of securable devices and (ii) to purchase goods or services in addition to rental of the securable device.

5. The system according to claim 4, wherein said second kiosk operates in parallel communication with said kiosk and is in communication with said kiosk, said second kiosk communicating information indicative of the securable device being rented via said second kiosk, thereby informing said kiosk that the securable device is rented to prevent said kiosk from simultaneously renting the securable device.

6. The system according to claim 1, wherein said lock unit is configured to receive the PIN from said kiosk, said lock unit further being configured to enable the user to access the securable device in response to the user entering the PIN into a user interface of said lock unit without further communication with said kiosk.

7. The system according to claim 1, wherein housings of said kiosk and the plurality of securable devices are physically separate from one another.

8. The system according to claim 1, wherein said kiosk further includes means for accepting payment for the goods or services.

9. The system according to claim 1, wherein said kiosk is further configured to accept an alternative form of payment in the event that a first form of payment for rental of the securable device or purchase of goods or services is rejected.

10. The system according to claim 1, wherein said kiosk is further configured to produce an administrative report inclusive of rentals of securable devices and sales of goods or services.

11. A method for assigning controlled access to a securable device, said method comprising:
    enabling, via a kiosk, a user to rent a securable device from among a plurality of securable devices;
    renting, by the kiosk, the securable device in response to the user performing a financial transaction via the kiosk;
    associating a unique personal identification number (PIN) with the user and the securable device;
    in response to receiving the PIN submitted by the user, enabling, by a lock unit associated with the securable device, the user to access the securable device after being rented by the user via the kiosk; and enabling, by the kiosk, the user to purchase goods or services in addition to rental of the securable device.

12. The method according to claim 11, further comprising configuring the kiosk as an Electronic Funds Transfer Point of Sale (EFT POS) to enable the user to rent the securable device and purchase goods and services.

13. The method according to claim 11, further comprising including a printer with the kiosk to print a receipt of a purchase of the goods or services.

14. The method according to claim 11, further comprising including a second kiosk configured to enable a user (i) to rent the securable device from among the plurality of securable devices and (ii) to purchase goods or services in addition to rental of the securable device.

15. The method according to claim 14, further comprising:
operating the second kiosk in parallel communication with the kiosk and being in communication with the kiosk; and
communicating, by the second kiosk to the kiosk, information indicative of the securable device being rented via the second kiosk, thereby informing the kiosk that the securable device is rented to prevent the kiosk from simultaneously renting the securable device.

16. The method according to claim 11, further comprising:
receiving the PIN, by the lock unit, from the kiosk; and
enabling the user, by the lock unit, to access the securable device in response to the user entering the PIN into a user interface of the lock unit without further communication with the kiosk.

17. The method according to claim 11, further comprising positioning the kiosk and the plurality of securable devices separate from one another.

18. The method according to claim 11, further comprising accepting payment, by the kiosk, for the goods or services.

19. The method according to claim 11, further comprising accepting an alternative form of payment in response to a first form of payment for rental of the securable device or payment for the goods or services being rejected.

20. The method according to claim 11, further comprising producing, by the kiosk, an administrative report inclusive of rentals of securable devices and sales of goods or services.

* * * * *